US009996477B2

(12) United States Patent
Chan et al.

(10) Patent No.: US 9,996,477 B2
(45) Date of Patent: Jun. 12, 2018

(54) ASYNCHRONOUS DRIVE TELEMETRY DATA NOTIFICATION

(71) Applicant: Western Digital Technologies, Inc, Irvine, CA (US)

(72) Inventors: Jeerun Chan, Fountain Valley, CA (US); Nadesan Narenthiran, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 146 days.

(21) Appl. No.: 15/265,317

(22) Filed: Sep. 14, 2016

(65) Prior Publication Data

US 2018/0074973 A1   Mar. 15, 2018

(51) Int. Cl.
G06F 12/00    (2006.01)
G06F 12/123   (2016.01)

(52) U.S. Cl.
CPC .... G06F 12/123 (2013.01); *G06F 2212/1032* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 7,194,623 B1 | 3/2007 | Proudler et al. | |
| 7,228,538 B1 * | 6/2007 | Burton | G06F 8/656 |
| | | | 717/170 |
| 8,090,691 B2 * | 1/2012 | Lynn | G06F 17/30368 |
| | | | 707/648 |
| 8,103,911 B2 | 1/2012 | Colaiacomo et al. | |
| 8,793,530 B2 | 7/2014 | Brown et al. | |
| 8,990,634 B2 | 3/2015 | Sadovsky et al. | |
| 2006/0206698 A1 | 9/2006 | Foucher et al. | |
| 2015/0193336 A1 | 7/2015 | Zhou | |
| 2015/0220413 A1 | 8/2015 | Hindi et al. | |

FOREIGN PATENT DOCUMENTS

EP          0759591 A1    2/1997

OTHER PUBLICATIONS

Smith, "Archiving and Analyzing the NT Security Log", Jun. 27, 2000, Retrieved from http://windowsitpro.com/security/archiving-and-analyzing-nt-security-log, 7 pgs.
NVM Express 1.2.1, Specification, Jun. 5, 2016, 217 pgs.

* cited by examiner

Primary Examiner — John A Lane
(74) Attorney, Agent, or Firm — Foley & Lardner LLP (57) ABSTRACT

A method is disclosed that includes, generating, by a controller of a storage device, telemetry data associated with the storage device and stored in a memory device of the storage device. The method further includes determining, by the controller, a telemetry data loss warning condition indicating that a portion of the telemetry data is predicted to be overwritten in the memory device by more recent telemetry data. In response to determining the telemetry data loss warning condition, the controller transmits, to a host device, an asynchronous event notification indicating the telemetry data loss warning condition.

18 Claims, 4 Drawing Sheets

ASYNCHRONOUS DRIVE TELEMETRY DATA NOTIFICATION

TECHNICAL FIELD

The disclosure generally relates to storage devices.

BACKGROUND

A storage device can be configured to generate event log data, statistics, metrics, and other data related to the internal and/or physical operation of the storage device, referred to herein as telemetry data. For example, the storage device may generate telemetry data corresponding to hardware events, errors, or alerts raised by the storage device. In another example, the storage device may generate telemetry data for performing testing, debugging, and tracing activities, e.g., as provided by ARM® Embedded Trace Macrocell (ETM) technologies, or by industry standards specified by the Joint Test Action Group (JTAG) organization. The storage device may store the telemetry data within a memory device of the storage device (e.g., non-volatile or volatile memory unit) for later retrieval and analysis.

SUMMARY

In one example, a method includes generating, by a controller of a storage device, telemetry data associated with the storage device and stored in a memory device of the storage device. The method includes determining, by the controller, a telemetry data loss warning condition indicating that a portion of the telemetry data is predicted to be overwritten in the memory device by more recent telemetry data, and in response to determining the telemetry data loss warning condition, transmitting, by the controller and to a host device, an asynchronous event notification indicating the telemetry data loss warning condition.

In another example, a method includes receiving, by a host device and from a controller of a storage device, an asynchronous event notification indicating that a portion of telemetry data associated with the storage device is predicted to be overwritten by more recent telemetry data. The method further includes, in response to receiving the asynchronous event notification, transmitting, by the host device and to the controller, a request for the telemetry data associated with the storage device, and receiving, by the host device, the portion of the telemetry data stored in a memory device of the storage device.

In another example, a storage device includes a memory device and a controller. The controller is configured to generate telemetry data associated with the storage device, and store the telemetry data in the memory device. The controller is further configured to determine a telemetry data loss warning condition indicating that a portion of the telemetry data is predicted to be overwritten in the memory device by more recent telemetry data, and, in response to determining the telemetry data loss warning condition, transmit, to a host device, an asynchronous event notification indicating the telemetry data loss warning condition.

The details of one or more examples are set forth in the accompanying drawings and the description below. Other features, objects, and advantages will be apparent from the description and drawings, and from the claims.

DETAILED DESCRIPTION

In general, this disclosure describes techniques for asynchronously sending telemetry data loss notifications for a data storage device, such as a solid state drive (SSD) or hard disk drive (HDD), in communication with a host device. The data storage device generates telemetry data, such as event logs and metrics related to the internal operations of the storage device. In some cases, an error may occur with the storage device, but the telemetry data that is later retrieved from the storage device might not contain useful information, because the internal memory space of the storage device reserved for storing telemetry data may be limited. As such, stored telemetry data may be subject to wrapping (i.e., newer data overwrites older data), and less useful information may be available for debugging and issue analysis, particularly for issues that take a long time to manifest.

In some examples, the storage device may communicate with the host device using Non-Volatile Memory Express (NVMe™), or a Non-Volatile Memory Host Controller Interface Specification (NVMHCI), which are a register-level, logical device interface specifications for access non-volatile storage media attached via PCI Express (PCIe) bus. NVMe™ enables host software to communicate with a non-volatile memory subsystem. In examples using NVMe™, the host device may issue an Asynchronous Event Request (AER) to the storage device to register to receive asynchronous notifications. Subsequently, in accordance with the techniques of this disclosure, the storage device may determine a telemetry data loss warning condition, which may indicate that telemetry data stored by the storage device will exceed internal allocated resources at a future time and that telemetry data will be lost upon the amount of telemetry data exceeding the internal allocated resources (e.g., due to wrapping). In response, the data storage device may asynchronously notify the host device using an AER Completion message. As a result, rather than only retrieve telemetry data in response to an issue, the host device may retrieve the drive telemetry data from the storage device in response to the asynchronous notification and store the telemetry data in a temporary local storage. This may facilitate maintaining a continuous and much larger log of telemetry data than available with only the storage device's internal memory. The host device may save the retrieved telemetry data to a more permanent local storage as a matter of course or if an issue is encountered. For example, the host device may send the telemetry data to the storage device's manufacturer for analysis after an issue has arisen, or periodically. The techniques of this disclosure may facilitate using telemetry data to analyze and detect issues that occur infrequently or only after relatively long periods of time, issues that manifest externally (e.g., to the host device or user) only long after occurrence of the initial issue, or the like. Additionally, or alternatively, techniques of this disclosure may facilitate using telemetry data from storage devices that have not encountered issues or errors to understand storage device usage patterns, usage environments, or the like, to enable more effective development of new storage devices, storage device software and firmware, or the like.

Figure 1:
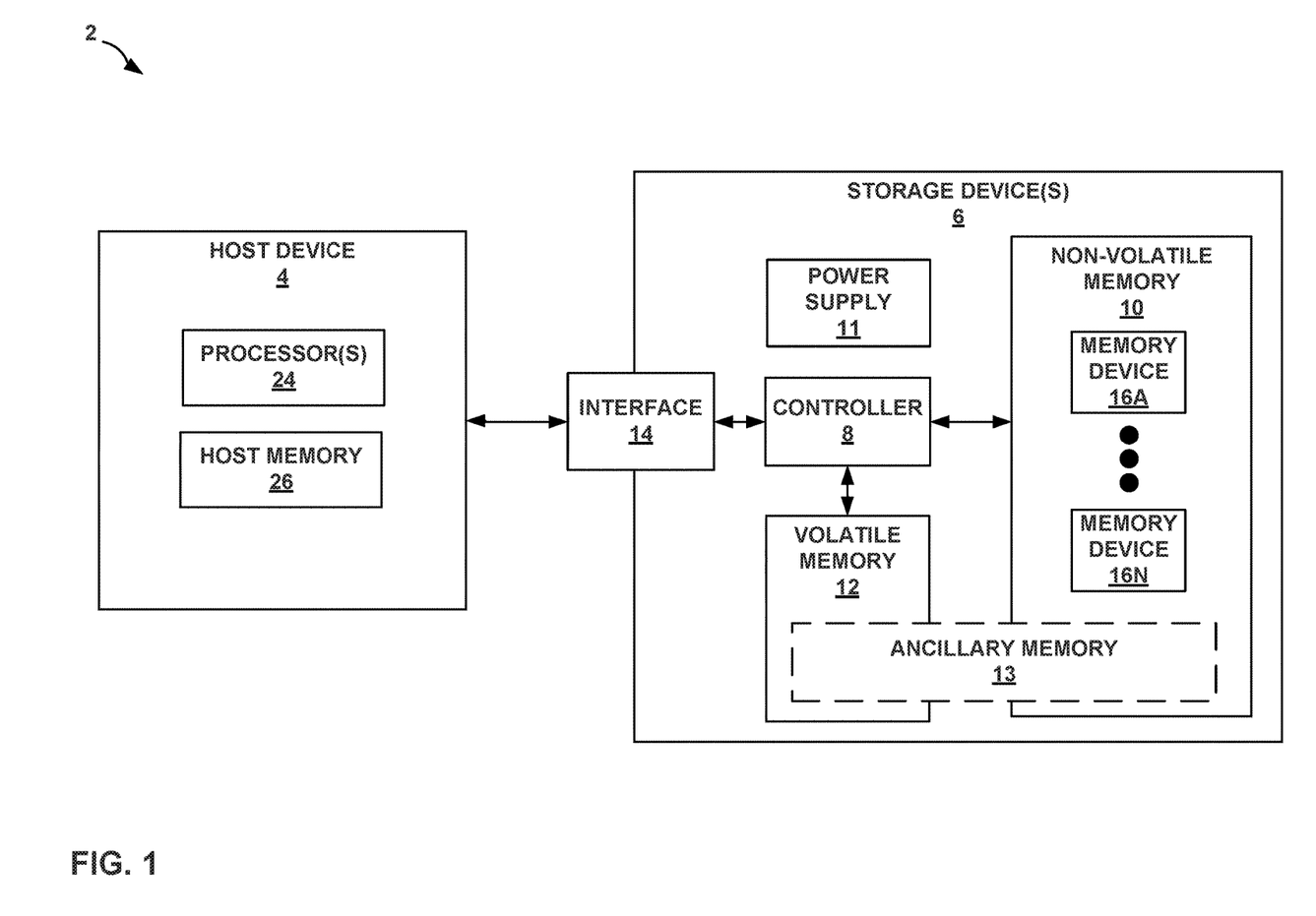
FIG. 1 is a conceptual and schematic block diagram illustrating an example storage environment in which a storage device may interact with a host device, in accordance with one or more techniques of this disclosure.

FIG. 1 is a conceptual and schematic block diagram illustrating an example storage environment 2 in which storage device 6 may function as a storage device for host device 4, in accordance with one or more techniques of this disclosure. For instance, host device 4 which may store data to and/or retrieve data from one or more storage devices 6. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Host device 4 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 4 may include at least one processor 24 and host memory 26. At least one processor 24 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 26 may be used by host device 4 to store information (e.g., temporarily store information). In some examples, host memory 26 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 6 may include controller 8, non-volatile memory 10 (NVM 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.), M.2, or the like. In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, as described in more detail with reference to FIG. 2-4, interface 14 may operate according to the Non-Volatile Memory Express (NVMe™) protocol. However, in other examples, the techniques of this disclosure may apply to an interface 14 that operates in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), PCI-express, or the like. The interface 14 (e.g., the data bus, the control bus, or both) is electrically connected to controller 8, providing a communication channel between host device 4 and controller 8, allowing data to be exchanged between host device 4 and controller 8. In some examples, the electrical connection of interface 14 may also permit storage device 6 to receive power from host device 4.

Storage device 6 may include volatile memory 12, which may be used by controller 8 to store information. In some examples, controller 8 may use volatile memory 12 as a cache. For instance, controller 8 may store cached information in volatile memory 12 until the cached information is written NVM 10. Volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6 includes NVM 10, which includes a plurality of memory devices 16A-16N (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 128 MB, 512 MB, 1GB, 4 GB, 16 GB, 64 GB, 128 GB, 512 GB, 1 TB, etc.). NVM 10 may include any type of non-volatile memory devices. Some examples of NVM 10 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices. Other examples of NVM 10 can include magnetic media, optical disks, floppy disks, flash memories, or forms of electrically programmable memories (EPROM) or electrically erasable and programmable memories (EEPROM). NVM 10 may be one or more magnetic platters in storage device 6, each platter containing one or more regions of one or more tracks of data.

In some examples, storage device 6 may include ancillary memory 13 that is comprised of storage resources from at least a portion of volatile memory 12, at least a portion of non-volatile memory 10, or both. Storage device 6 uses ancillary memory 13 to support the primary activity of storing information, e.g., for host device 4. For example, storage device 6 may use ancillary memory 13 to temporarily store telemetry data generated during operations of storage device 6, as described in greater detail below.

Storage device 6 includes controller 8, which may manage one or more operations of storage device 6. For instance, controller 8 may manage the reading of data from and/or the writing of data to memory devices 16. Controller 8 may represent one of or a combination of one or more of a microprocessor, digital signal processor (DSP), application specific integrated circuit (ASIC), field programmable gate array (FPGA), or other digital logic circuitry.

In some examples, controller 8 may generate telemetry data associated with storage device 6 and store the telemetry data in a memory device (e.g., ancillary memory 13) of storage device 6. For example, controller 8 may generate telemetry data that includes internal event logs corresponding to operations performed by storage device 6 and store the telemetry data within a designated portion of ancillary memory 13 (e.g., a location within volatile memory 12, in a location within non-volatile memory 10, or some combination of both).

Controller 8 may be configured to generate asynchronous events to notify host device 4 of status, error, and health information related to storage device 6 as such events occur. According to some examples of the present disclosure, controller 8 may determine a telemetry data loss warning condition indicating that a portion of the telemetry data is predicted to be overwritten in the memory device (e.g., ancillary memory 13) by more recent telemetry data. For example, controller 8 may detect the finite amount of resources of ancillary memory 13 designated for storing telemetry data has been exhausted or will be imminently exhausted. In response to determining this telemetry data loss warning condition, controller 8 may transmit, to host device 4, an asynchronous event notification indicating the telemetry data loss warning condition. For example, controller 8 may transmit, to host device 4 via interface 14 of storage device 6, an NVMe™ Asynchronous Event Notification message having a value set that represents a telemetry data loss imminent notification.

In some examples, host device 4 receives, from controller 8 of storage device 6, the asynchronous event notification indicating that a portion of the telemetry data is predicted to be overwritten by more recent telemetry data. In response to receiving the asynchronous event notification, host device 4 may transmit, to controller 8 of storage device 6, a request for the telemetry data associated with the storage device. For example, a host software program executing on host device 4 may transmit, via interface 14, a telemetry data request to controller 8. In response to receiving the request, controller 8 may retrieve the telemetry data and transmit, via interface 14, the telemetry data to host device 4. Host device 4 may receive, from storage device 6, the portion of the telemetry data stored in a memory device (e.g., ancillary memory 13) of storage device 6. In some examples, host device 4 may store the received telemetry data in host memory 26 or in a secondary storage device (not shown) communicatively connected to host device 4.

In alternative examples, host device 6 may be part of a storage sub-system with storage device 6 that is configured to provide asynchronous notifications according to techniques of the present disclosure. For example, storage device 6 may be a RAID array, and host device 4 may be a host controller or enclosure that manages the RAID array. In this example, in response to asynchronous notifications from the RAID array, host device 4 may retrieve diagnostic data across multiple storage devices in the RAID array that host device 4 is managing. In another alternative embodiment, an intermediary device communicatively connected between host device 2 and storage device 6 may be configured according to techniques of this disclosure. For example, an intermediary device (e.g., host bus adapter (HBA), RAID controller, enclosure) may have diagnostics and telemetry data of its own. As such, responsive to detecting that its internal resources for logging such telemetry data may be exceeded, the intermediary device may asynchronously notify a host device according to techniques of this disclosure.

Accordingly, the described techniques allow for the collection of more telemetry data than is possible within the limited capability of a single storage device. As such, asynchronous notifications for telemetry data enable deeper tracing and debugging to be performed, because multiple event logs can be post-processed and stitched together to form a continuous log that is larger than the space allocated within storage device 6 itself for storing telemetry data. Furthermore, controller 8 can be modified to increase the verbosity and level of detail of the telemetry data that was not practical due to space limitations imposed by other approaches. As such, examples of the present disclosure allow for increased verbosity which improves tracing and debugging capabilities of storage device 6.

Additionally, asynchronous notification for telemetry data provides for the ongoing collection of telemetry data, which enables a host application to better analyze customer usage cases and environments. Rather than being limited to analyzing the telemetry data found within the storage device at the time an error is triggered, the host application may be able to analyze telemetry data that was logged well before the error occurred, as well as analyze the telemetry data of non-failing storage devices in contrast with data from failing devices. By having extensive amounts of telemetry data, techniques described in the present disclosure allows for the analysis of issues without needing to reproduce the issues in a real or simulated customer environment.

According to examples of the present disclosure, rather than continually retrieve telemetry data in regular intervals (which can result in the loss of telemetry data if the retrieval interval is set too large, or cost additional system resources if the retrieval interval is set too small), the host application may retrieve telemetry data in response to being expressly notified that the storage device may begin overwriting its older telemetry data. Furthermore, the described asynchronous event notifications efficiently inform host application when telemetry data loss may occur, rather than periodically poll the storage device about the status of a buffer for telemetry data (which can result in the loss of telemetry data from the additional overhead incurred by polling).

Figure 2:
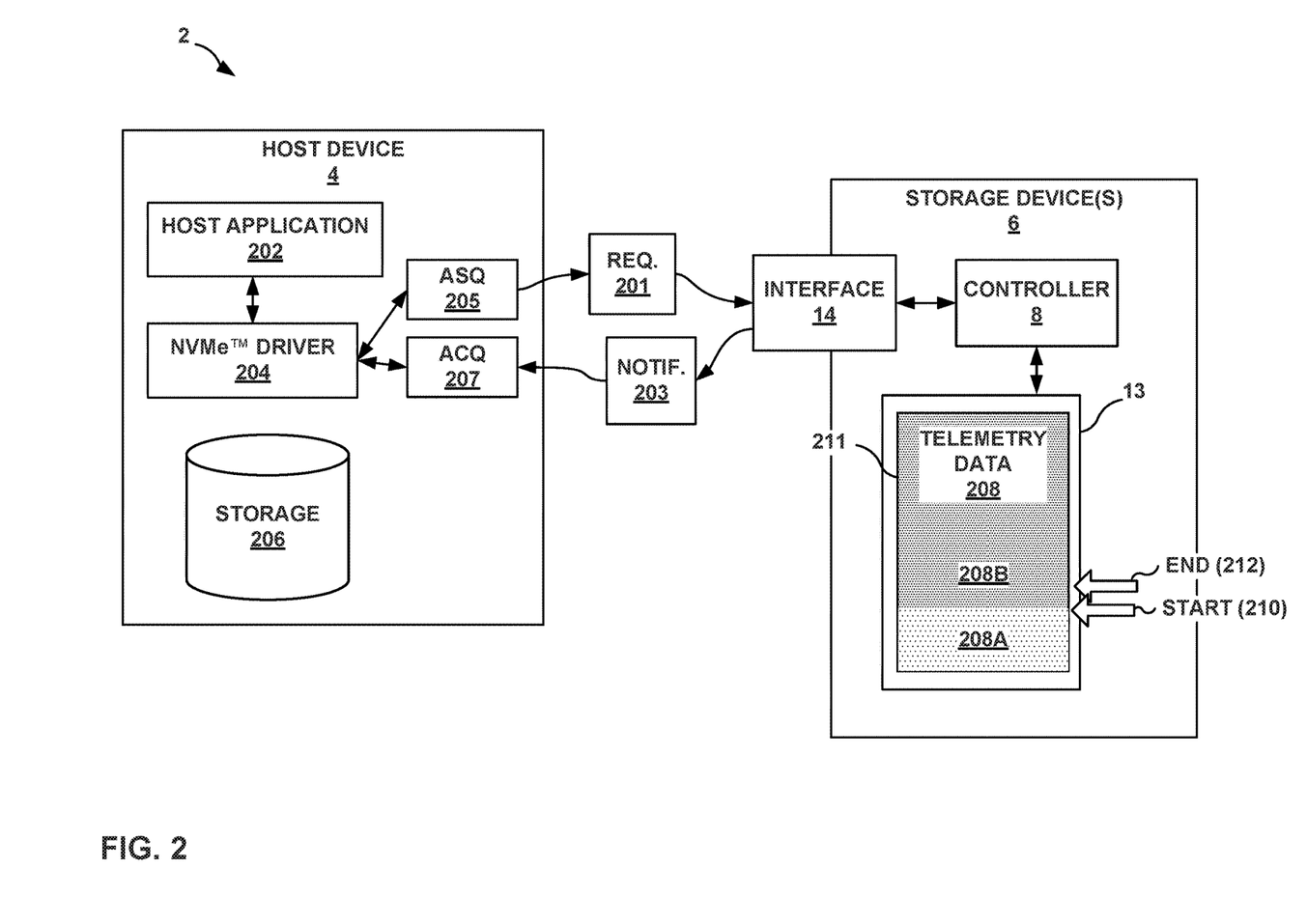
FIG. 2 is a conceptual and schematic block diagram illustrating an example storage environment in which a storage device may interact with a host device, in accordance with one or more techniques of this disclosure.

FIG. 2 is a conceptual and schematic block diagram illustrating an example storage environment 2 in which storage device 6 may interact with host device 4, in accordance with one or more techniques of this disclosure. FIG. 2 illustrates and describes conceptual and functional elements of FIG. 1, with concurrent reference to the physical components illustrated in FIG. 1.

Storage device 6 includes ancillary memory 13, of which at least a portion is allocated for storing telemetry data 208 associated with storage device 6. For example, controller 8 may allocate a particular amount of resources from ancillary memory 13 to a buffer 211 for storing telemetry data 208. In some implementations, buffer 211 may be a circular buffer using a fixed amount of resources in ancillary memory 13 to store telemetry data 208. For example, controller 8 may maintain a head pointer (e.g., start pointer 210) that indicates a start of data within buffer 211, a tail pointer (e.g., an end pointer 212) that indicates an end of data within buffer 211, and other supporting metadata and pointers. While the present disclosure describes an example using a circular buffer, other examples may implement other types of data structures for storing and maintaining telemetry data 208 within a fixed amount of allocated resources in ancillary memory 13.

In the example depicted in FIG. 2, telemetry data 208 includes a less recent portion of telemetry data 208A stored at locations beginning by a location referenced by start pointer 210 and a more recent portion of telemetry data 208B stored at locations ending at a location referenced by end pointer 212. To retrieve the earliest available stored telemetry data (i.e., less recent portion 208A), controller 8 may retrieve telemetry data stored at locations referenced by start pointer 210. When generating new telemetry data, controller 8 may store the more recent telemetry data 208B at the location in buffer 211 referenced by end pointer 212 and increment end pointer 212 to a next location within buffer 211. In situations where buffer 211 is full (i.e., resources allocated to buffer 211 have been fully utilized), controller 8 may overwrite less recent portions of telemetry data 208A with more recent portions of telemetry data 208B, and increment both start pointer 210 and end pointer 212.

Host device 4 (e.g., processors 24) may execute, among other modules not shown in FIG. 2, a host application 202 and an NVMe™ driver 204. Host application 202 may be a software application, such as a daemon or a service, executing on host device 4 that manages the configuration, monitoring, reporting, and diagnostics of storage device 6. According to examples of this disclosure, host application 202 may be configured to manage telemetry data generated by storage device 6. For example, host application 202 may be a device manager application configured to retrieve telemetry data from storage device 6 in response to an asynchronous notification from storage device 6 that data loss of such telemetry data is imminent.

NVMe™ driver 204 may include all driver data and functionality for controlling interaction between host 4 and storage device 6 according to the NVMe™ protocol. NVMe™ driver 204 may be configured to manage a queuing interface of host device 4 that includes one or more administrative queues and a plurality of I/O queues. In some examples, the administrative queues may include a paired Admin Submission Queue (ASQ) 205 and Admin Completion Queue (ACQ) 207 for communicating device management commands and results between host device 4 and storage device 6. Each of ASQ 205 and ACQ 207 may be implemented in host memory 26 shown in FIG. 1.

Host device 4 may be communicatively connected to storage 206, which represents one or more storage devices configured for storing telemetry data 208 retrieved from storage device 6. Storage 206 may be a local device, network storage, internal storage, or external storage separate from non-volatile memory 10 of storage device 6, or in alternative examples, may even be non-volatile (and non-ancillary) memory 10 of storage device 6.

In accordance with examples of this disclosure, host application 202 may register with storage device 6 to receive asynchronous notifications related to telemetry data loss. For example, host application 202 may register for asynchronous notifications by sending, to storage device 6 via ASQ 205, an indication of an Asynchronous Event Request (AER) command 201 indicating that host application 202 would like to be notified when telemetry data 208 may soon exceed internal allocated resources in ancillary memory 13 and that telemetry data loss is imminent. The notifications may be characterized as "asynchronous" because host application 202 does not expect controller 8 of storage device 6 to execute the command 201 immediately (i.e., synchronously), but rather, expects command 201 to be completed when there is an event to be reported.

In one implementation, NVMe™ driver 204 may submit a submission queue entry to ASQ 205 having an instruction (e.g., opcode value "0Ch") representing an Asynchronous Event Request. In some examples, NVMe™ driver 204 can specify a particular type of event to be notified of. NVMe™ driver 204 may submit a command to ASQ 205 that specifies which particular events trigger an asynchronous event notification to host device 4. In one implementation, NVMe™ driver 204 may send, via ASQ 205, a Set Features command having an Asynchronous Event Configuration that configures storage device 6 to mask for the telemetry data loss event notification. For example, the asynchronous event configuration may be implemented with a bit field that masks for certain types of asynchronous events, and a designated bit in that bit field (e.g., bit 10) determines whether an asynchronous notification is sent to host device 4 for a Telemetry Data Loss Imminent Notification. That is, if the designated bit is set to "1", then storage device 6 is configured to send a telemetry data loss imminent notification to host device 4 when this condition occurs, and conversely, if the designated bit is set to "0", then storage device 6 is configured to not send a telemetry data loss imminent notification even if the condition occurs.

In some examples, controller 8 of storage device 6 may be configured to predict that drive telemetry data loss is imminent based on the state of buffer 211 and asynchronously notify host device 4. In some examples, controller 8 may determine the telemetry data loss warning condition based on a number of new entries that can fit within buffer 211 without overwriting portions of telemetry data (e.g., portion 208A) that have not yet been retrieved. For example, controller 8 may compare start pointer 210 and end pointer 212 of buffer 211 and calculate that the distance between the pointers is less than a threshold value. Controller 8 may infer, based on the calculated distance, that the buffer 211 is nearly full of telemetry data that has not been communicated to host device 4, and predict that new telemetry data 208 may trigger the end pointer 212 to push into space occupied by less recent portions of telemetry data 208A, resulting in the less recent portions 208A being overwritten. Controller 8 may perform the comparison periodically, or in response to some action, such as changes to buffer 211 or generation of new telemetry data 208. In other examples, controller 8 may maintain a live count of the amount of spare space within buffer 211 for storing telemetry data 208. When the amount of spare space is less than a threshold amount (or reaches zero), controller 8 may declare that drive telemetry data loss is imminent. Controller 8 may be configured with a threshold distance or threshold amount of spare space that is selected based on estimated remaining entries of telemetry data or based on an estimated rate of generating telemetry data. For instance, controller 8 may select a threshold distance of 20 KB based on a determination that there are 5 remaining entries of 4 KB left in buffer 211. In another instance, controller 8 may select a threshold distance of 20 KB based on a determination that the average generation rate of telemetry data has been approximately 10 KB/minute, thereby estimating that telemetry data loss may occur in 2 minutes or less.

In some examples, controller 8 may send an asynchronous event notification 203 to host application 202, via interface 14, indicating that the controller telemetry data will soon exceed internal allocated resources so that host application 202 may act. For example, controller 8 may report asynchronous event notification 203 to host device 4 by posting, in Admin Completion Queue (ACQ) 207, a completion queue entry corresponding to asynchronous event request 201. At least one portion of the completion queue entry (e.g., the initial doubleword, or "Dword 0") may contain information about the asynchronous event. One example definition for the completion queue entry corresponding to the asynchronous event is provided below in Table 1.

TABLE 1

Asynchronous Event Request (Completion Queue Entry Dword 0)

| Bit | Description |
|---|---|
| 31:24 | Reserved |
| 23:16 | Log Page Identifier: indicates the log page associated with the asynchronous event. This log page can be read by the host to clear the event. |
| 15:08 | Asynchronous Event Information (see Table 2) |
| 07:03 | Reserved |
| 02:00 | Asynchronous Event Type: indicates the type of the asynchronous event. More specific information on the event is provided in the Asynchronous Event Information field |

| Value | Definition |
|---|---|
| 0h | Error status |
| 1h | SMART/Health status |
| 2h | Notice |
| 3h-5h | Reserved |
| 6h | I/O Command Set specific status |
| 7h | Vendor specific |

As shown in Table 1, an asynchronous event notification 203 may include an asynchronous event information field and an asynchronous event type field. Asynchronous events may be characterized and grouped into different event types, such as an error event type (indicating a general error not associated with a specific command), a health status event type (e.g., indicating an issue with reliability, temperature, or spare space), and a notice event type (indicating an issue internally detected by storage device 6). The asynchronous event information field may provide additional information related to the asynchronous event. Values in the asynchronous event information field may represent different information depending on the event type. One example format for the Asynchronous Event Information field in asynchronous event notification 203 is provided below in Table 2.

TABLE 2

Asynchronous Event Information (Notice event type)

| Value | Description |
|---|---|
| 0h | Namespace Attribute Changed: The Identify Namespace data structure for one or more namespaces has changed. Host software may use this event as an indication that it should read the Identify Namespace data structures for each namespace to determine what has changed. A controller shall not send this event when Namespace Utilization has changed, as this is a frequent event that does not require action by the host. A controller shall only send this event for changes to the Format Progress Indicator field when bits 6:0 of that field transition from a non-zero value to zero or from a zero value to a non-zero value. |
| 1h | Firmware Activation Starting: The controller is starting a firmware activation process during which command processing is paused. Host software may use CSTS.PP to determine when command processing has resumed. To clear this event, host software reads the Firmware Slot Information log page. |
| 2h | New Saved Telemetry Log: The controller has saved the device internal state in Saved Telemetry Log and set the Saved Telemetry data field to one. |
| 3h | Telemetry Data Loss Imminent Notification: The controller telemetry data will soon exceed internal allocated resources and telemetry data loss is imminent. Host software may use this event as an indication that it should collect controller telemetry data to prevent loss of telemetry data. |
| 4h-FFh | Reserved |

In some examples, controller 8 may transmit an indication of an asynchronous event notification 203 having an event information field value that represents a Telemetry Data Loss Imminent Notification to host device 4, by storing the indication in Admin Completion Queue (ASQ) 207. For example, based on the format described in Tables 1 and 2, controller 8 may store, in ACQ 207, a completion queue entry having an event type field value (e.g., value 2h in bytes 02:00) indicating a Notice Event Type and an event information field value (e.g., value 3h in bytes 15:08) indicating a Telemetry Data Loss Imminent Notification. It is understood that other specific field values and/or other data fields may be designated to represent the telemetry data loss notification.

Host application 202 may be configured to react to the receipt of the event notification and collect the controller telemetry data 208 from storage device 6. In some examples, host device 4 may transmit a Get Log Page command to storage device 6 requesting a portion of telemetry data 208. In some examples, host application 202 may be configured to save the telemetry data to temporary storage (represented by storage 206) for some duration, thereby acting as an extended buffer to buffer 211 in storage device 6. For example, host application 202 may be configured to keep retrieved telemetry data in storage 206 for a particular number of days (e.g., 1 week), or in another example, up to a particular amount of storage space (e.g., 100 GBs). In other examples, host application 202 may be configured to save the telemetry data to a permanent storage (also represented by storage 206) if situations where host application 202 later detects that an issue was encountered. In some examples, host application 202 may transmit the telemetry data stored in storage 206 to the storage device's manufacturer for analysis in response to detecting an issue, or periodically.

Figure 3:
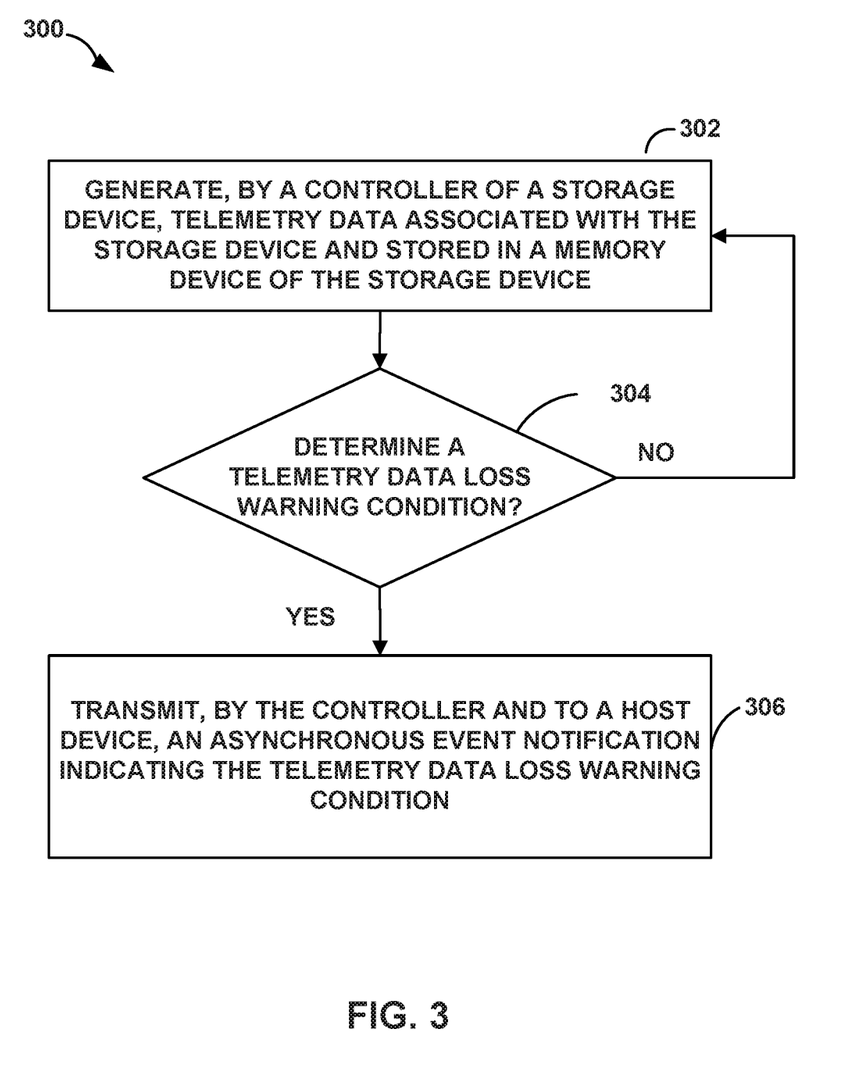
FIG. 3 is a flow diagram illustrating an example technique for sending asynchronous drive telemetry data notifications, in accordance with one or more techniques of this disclosure.

FIG. 3 is a flow diagram illustrating an example technique 300 for sending asynchronous drive telemetry data notifications, in accordance with one or more techniques of this disclosure. For ease of illustration, the technique of FIG. 3 will be described with concurrent reference to storage environment 2 of FIGS. 1 and 2. However, the techniques may be used with any combination of hardware or software.

In some examples, controller 8 may generate telemetry data 208 associated with the storage device 6 and stored in a memory device of the storage device (302). For example, telemetry data 208 may include internal event logs associated with operation of storage device 6. In some examples, controller 8 stores generated telemetry data 208 in ancillary memory 13, and updates a head pointer and a tail pointer (e.g., pointers 210, 212) referencing locations of the memory device according to a first-in-first-out technique.

In some examples, controller 8 may determine a telemetry data loss warning condition indicating that a portion of the telemetry data 208A is predicted to be overwritten in the memory device by more recent telemetry data 208B (304). In some examples, controller 8 may determine the telemetry data loss warning condition by determining that a distance between the head pointer and the tail pointer satisfies a threshold distance. For example, controller 8 may determine the telemetry data loss warning condition by calculating that a distance between a memory location referenced by start pointer 210 and the memory location referenced by end pointer 212 is less than a threshold value (e.g., less than 4 kilobytes apart). In another example, controller 8 may determine the telemetry data loss warning condition by determining that the available space in buffer 211 for storing telemetry data is less than a threshold minimum amount of space.

In some examples, in response to determining the telemetry data loss warning condition (e.g., "YES branch of decision block 304), controller 8 may transmit, to host device 4, an asynchronous event notification 203 indicating the telemetry data loss warning condition (306). For example, the asynchronous event notification may include a Non-Volatile Memory Express (NVMe™) specification protocol message. In some examples, controller 8 receives, from host device 4, a request to register for an asynchronous event notification. In some examples, controller 8 transmits asynchronous event notification 203 indicating the determined telemetry data loss warning condition in response to a request, received by controller 8 and from host device 4, to register for an asynchronous event notification. In some examples, in response to transmitting asynchronous event notification 203 to host device 4, controller 8 may receive, from host device 4, a request for the telemetry data associated with storage device 6. In response to receiving the request for the telemetry data, controller 8 transmits, to host device 4, at least a portion of the telemetry data (e.g., portion 208A) stored in the memory device 13 of the storage device.

In some examples, in response to determining that a telemetry data loss warning condition indicating that a portion of telemetry data 208A is not predicted to be overwritten, controller 8 may continue to generate and store telemetry data 208 associated with the operating state of storage device 6 ("NO" branch of decision block 304). For example, controller 8 may generate a second portion of telemetry data 208 and store the second portion of telemetry data 208 in a buffer 211 in ancillary memory 13.

Figure 4:
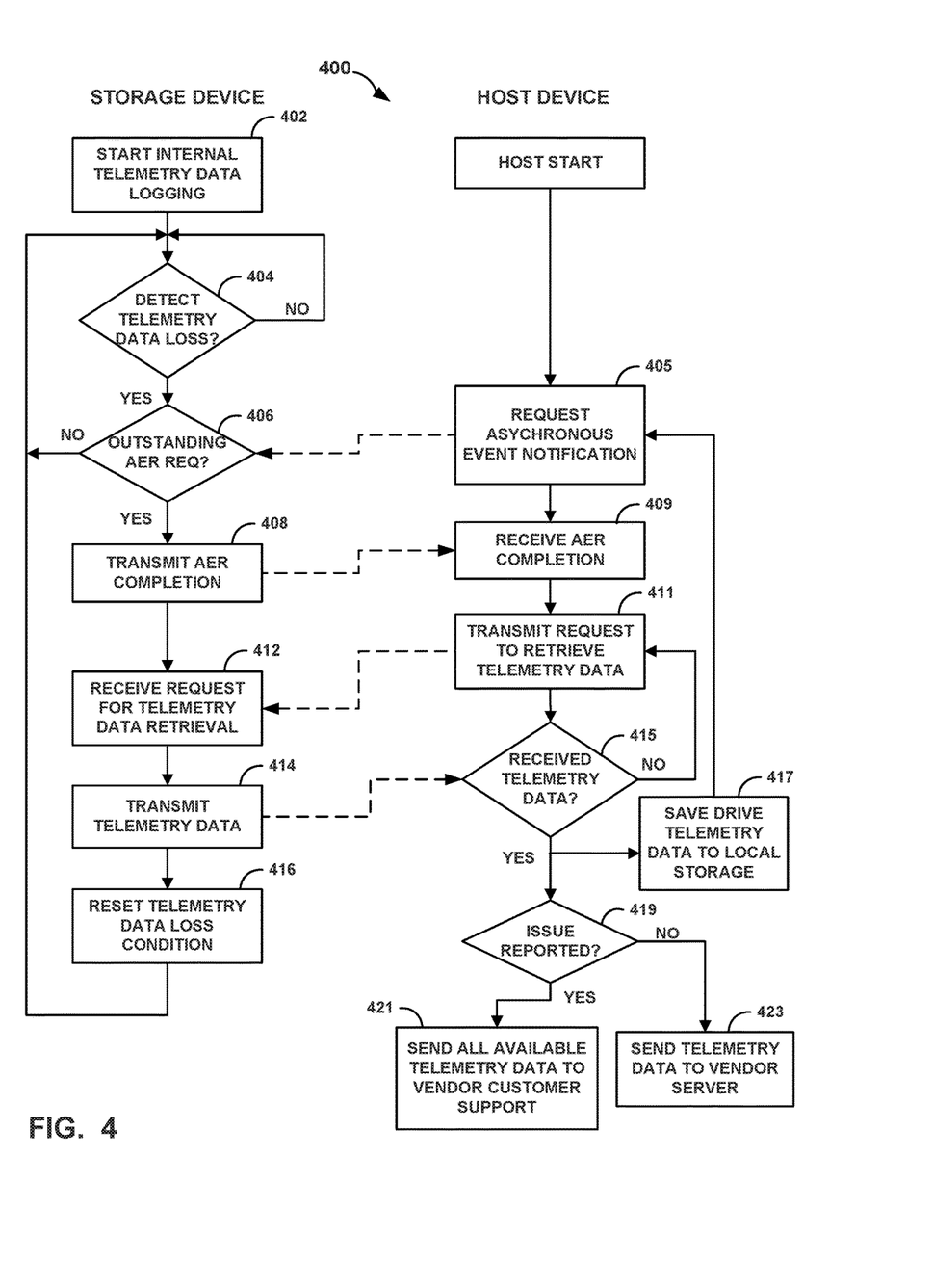
FIG. 4 is a flow diagram illustrating another example technique for sending asynchronous drive telemetry data notifications, in accordance with one or more techniques of this disclosure.

FIG. 4 is a flow diagram illustrating another example technique 400 for sending asynchronous drive telemetry data notifications, in accordance with one or more techniques of this disclosure. For ease of illustration, the technique of FIG. 4 will be described with concurrent reference to storage environment 2 of FIGS. 1 and 2. However, the techniques may be used with any combination of hardware or software.

In some examples, controller 8 of storage device 6 may initiate the logging of internal telemetry data (402). For instance, controller 8 may generate internal telemetry data having event logs that include information regarding the operations and status of storage device 6. Controller 8 may store the internal telemetry data within an ancillary memory 13 of storage device 6 allocated for telemetry data.

In some examples, host device 4 may request, from storage device 6, asynchronous event notifications related to possible internal telemetry data loss (405). Host application 202 may transmit, to storage device 6, a request to register host device 4 for an asynchronous event notification. In some examples, the request may include an indication for all asynchronous event notifications, or for all asynchronous event notifications of a particular event type (e.g., Notice). In some examples, the request may include one or more configuration commands (part of, or separate from, request command 201) that include an indication for an asynchronous event type representing a telemetry data loss warning condition. For instance, host application 202 executing on host device 4 may post, to ASQ 205 of host device 4, a command 201 containing an opcode (e.g., value "0Ch") representing an asynchronous event request. Host application may submit to ASQ 205 of host device 4, an asynchronous event configuration (e.g., bit value 1 in a designated bit field) that determines that an asynchronous event notification should be sent to host device 4 for a Telemetry Data Loss Imminent event.

Controller 8 may detect a telemetry data loss warning condition based on a state of ancillary memory 13 storing telemetry data 208 (404). For example, controller 8 may determine a telemetry data loss warning condition exists based on a determination that there is a high likelihood that some portion of telemetry data 208 will be overwritten by more recently logged telemetry data. In response to not detecting a telemetry data loss warning condition, controller 8 may continue to generate and log internal telemetry data (the "NO" branch of decision block 404).

In some examples, in response to detecting a telemetry data loss warning condition, controller 8 may determine whether there are any outstanding Asynchronous Event Requests (AER) messages, from a host device 4 (406). For example, controller 8 may check an internal queue of controller 8 for any AER commands 201, which were previously retrieved from ASQ 205 of host device 4, and indicating a request to be notified of possible telemetry data loss. If there are no outstanding AER commands, controller 8 may continue to generate and log telemetry data (the "NO" branch of decision block 406).

In response to determining there is at least one outstanding AER command (the "YES" branch of decision block 406), controller 8 may transmit an AER completion notification 203 to host device 4 that notifies host device 4 of the telemetry data loss issue (408). For example, controller 8 may post, to ACQ 207, a completion queue entry corresponding to the AER command earlier received on ASQ 205, to report the asynchronous event to host device 4.

In some examples, host device 4 receives, from controller 8 of storage device 6, the AER completion notification 203 (409). That is, host application 202 may receive the asynchronous event notification 203 indicating that a portion of telemetry data 208 associated with storage device 6 is predicted to be overwritten by more recent telemetry data. For example, host device 4 may check ACQ 207 for any completion entries indicating an event notification related to telemetry data loss.

In response to receiving the AER completion notification 203, host device 4 may transmit, to controller 8, a request for the telemetry data associated with storage device 6 (411). Controller 8 may receive, from host device 4, the request for retrieving telemetry data (412). In response, controller 8 may transmit, to host device 4, the requested telemetry data (414). Controller 8 may reset the telemetry data loss warning condition (416) and return to generating internal telemetry data and detecting for any subsequent telemetry data loss.

In some examples, host device 4 receives the portion of the telemetry data stored in a memory device (e.g., ancillary memory 13) of storage device 6 from controller 8 (415). Host device 4 may save the received telemetry data to local storage 206 (417) and request, from storage device 6, new asynchronous event notifications related to possible internal telemetry data loss (405). In some examples, in response to determining that telemetry data has not been received from storage device 6, host device 4 may retransmit a request to retrieve telemetry data from storage device 6 (e.g., "NO" branch of block 415). For example, host device 4 may transmit a second request to retrieve telemetry data in response to expiry of a timeout counter and determining that telemetry data has not been successfully received. In another example, host device 4 may start an abort/reset process in response to the retrieval timing out, and may not retransmit a second request without aborting all outstanding commands.

In some examples, at a time subsequent to retrieving the telemetry data from storage device 6, host device 4 may determine whether an issue associated with storage device 6 has been reported (419). If so (e.g., "YES" branch of decision block 419), host device 4 may send all available telemetry data (421), such as that stored in storage 206, for analysis, for example, by a vendor customer support associated with storage device 6. Otherwise (e.g., "NO" branch of decision block 419), host device 4 may periodically send the telemetry data to a vendor server (423). In another example, host device 4 may request a second portion of telemetry data from storage device 6 in response to determining that an error associated with storage device 6 has occurred subsequent to receiving a first portion of telemetry data (e.g., at 415). In some examples, host device 4 may retry a request for a first portion of telemetry data if an error occurred (e.g., at 411).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   generating, by a controller of a storage device, telemetry data associated with the storage device and stored in a memory device of the storage device;
   determining, by the controller, a telemetry data loss warning condition indicating that a portion of the telemetry data is predicted to be overwritten in the memory device by more recent telemetry data; and
   in response to determining the telemetry data loss warning condition, transmitting, by the controller and to a host device, an asynchronous event notification indicating the telemetry data loss warning condition.

2. The method of claim 1, further comprising:
   receiving, by the controller and from the host device, a request for the telemetry data associated with the storage device; and
   in response to receiving the request for the telemetry data, transmitting, by the controller and to the host device, at least the portion of the telemetry data stored in the memory device of the storage device.

3. The method of claim 1, further comprising:
   receiving, by the controller and from the host device, a request to register for the asynchronous event notification;
   wherein the transmitting the asynchronous event notification indicating the determined telemetry data loss warning condition is performed in further response to the request to register from the host device.

4. The method of claim 1, wherein generating the telemetry data associated with the storage device further comprises:
   updating, by the controller, a head pointer and a tail pointer referencing locations of the memory device according to a first-in-first-out technique for storing the telemetry data in the memory device;
   wherein determining the telemetry data loss warning condition indicating that the portion of the telemetry data is predicted to be overwritten further comprises determining that a distance between the head pointer and the tail pointer satisfies a threshold distance.

5. The method of claim 1, wherein the telemetry data comprises internal event logs associated with operation of the storage device.

6. The method of claim 1, wherein the asynchronous event notification comprises a Non-Volatile Memory Express (NVMe™) specification protocol message.

7. A method comprising:
   receiving, by a host device and from a controller of a storage device, an asynchronous event notification indicating that a portion of telemetry data associated with the storage device is predicted to be overwritten by more recent telemetry data; and
   in response to receiving the asynchronous event notification:
      transmitting, by the host device and to the controller, a request for the telemetry data associated with the storage device; and
      receiving, by the host device, the portion of the telemetry data stored in a memory device of the storage device.

8. The method of claim 7, further comprising:
   transmitting, by the host device and to the storage device, a request to register the host device for the asynchronous event notification, wherein the request includes an indication of an asynchronous event type representing a telemetry data loss warning condition.

9. The method of claim 8, wherein the request to register the host device for the asynchronous event notification comprises an Asynchronous Event Request message formatted according to a Non-Volatile Memory Express (NVMe™) specification protocol.

10. The method of claim 7, wherein the portion of the telemetry data stored in the memory device of the storage device comprises a first portion of telemetry data, and wherein the method further comprises:
    in response to determining that an error associated with the storage device has occurred, requesting a second portion of telemetry data stored in the storage device, wherein the error has occurred subsequent to receiving the first portion of telemetry data.

11. The method of claim 7, wherein the telemetry data comprises internal event logs associated with operation of the storage device.

12. The method of claim 7, wherein the asynchronous event notification comprises a Non-Volatile Memory Express (NVMe™) Specification protocol message.

13. A storage device comprising:
    a memory device; and
    a controller configured to:
       generate telemetry data associated with the storage device;
       store the telemetry data in the memory device;
       determine a telemetry data loss warning condition indicating that a portion of the telemetry data is predicted to be overwritten in the memory device by more recent telemetry data; and
       in response to determining the telemetry data loss warning condition, transmit, to a host device, an asynchronous event notification indicating the telemetry data loss warning condition.

14. The storage device of claim 13, wherein the controller is further configured to:
    receive, from the host device, a request for the telemetry data associated with the storage device; and
    in response to receiving the request for the telemetry data, transmit, to the host device, at least the portion of the telemetry data stored in the memory device of the storage device.

15. The storage device of claim 13, wherein the controller is further configured to:
    receive, from the host device, a request to register for the asynchronous event notification;
    wherein the transmitting the asynchronous event notification indicating the determined telemetry data loss warning condition is performed in further response to the request to register from the host device.

16. The storage device of claim 13, wherein the controller configured to generate the telemetry data associated with the storage device is further configured to:
    update a head pointer and a tail pointer referencing locations of the non-volatile memory device according to a first-in-first-out technique for storing the telemetry data in the memory device;
    wherein the controller configured to determine the telemetry data loss warning condition indicating that the portion of the telemetry data is predicted to be overwritten is further configured to determine that a distance between the head pointer and the tail pointer satisfies a threshold distance.

17. The storage device of claim 13, wherein the telemetry data comprises internal event logs associated with operation of the storage device.

18. The storage device of claim 13, wherein the asynchronous event notification comprises a Non-Volatile Memory Express (NVMe™) Specification protocol message.

* * * * *